Figure 1:
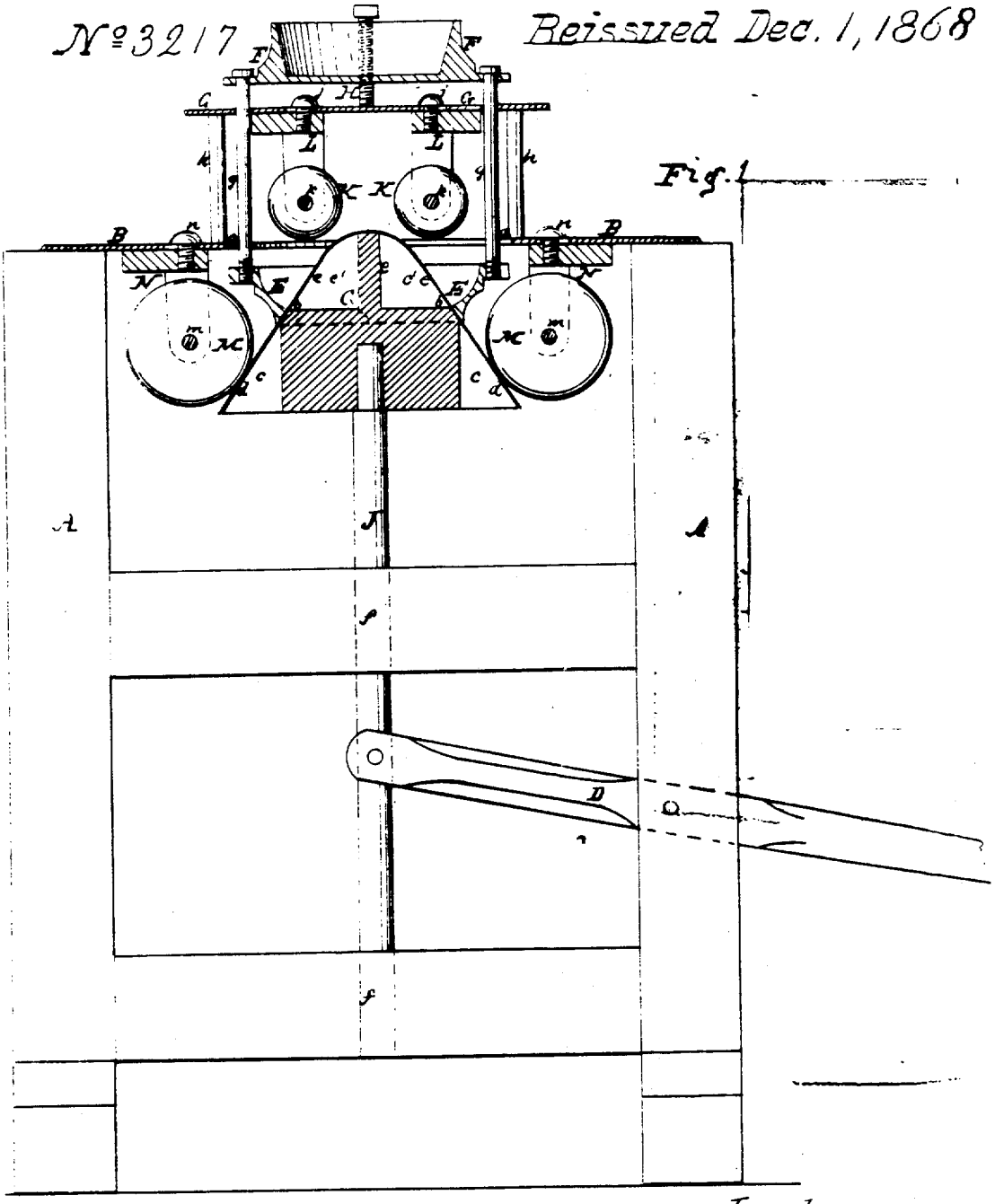

BEST AVAILABLE COPY

R. Eickemeyer.

Blocking & Stretching Hats.

No 3217 Reissued Dec. 1, 1868

Witnesses:
H. W. Combs
G. W. Reed

Inventor.
R. Eickemeyer
per Brown, Coombs & Co
Attorneys

Sheet 2

R. Eickemeyer.

Blocking & Stretching Hats.

No 3217 Reissued Dec. 1, 1868.

Witnesses
F. W. Coombs
G. W. Reed

Inventor
R. Eickemeyer
per Brown, Coombs & Allen
Attorneys

UNITED STATES PATENT OFFICE.

EICKEMEYER HAT BLOCKING MACHINE COMPANY, OF YONKERS, NEW YORK, ASSIGNEES OF R. EICKEMEYER.

IMPROVEMENT IN MACHINES FOR STRETCHING HAT-BODIES.

Specification forming part of Letters Patent No. 46,553, dated February 28, 1865; Reissue No. 3,217, dated December 1, 1868.

*To all whom it may concern:*

Be it known that I, RUDOLF EICKEMEYER, of Yonkers, in the county of Westchester and State of New York, have invented a new and Improved Machine for Stretching Hat-Bodies; and I do hereby declare that the following is a full and correct description thereof, reference being had to the accompanying drawings.

In the manufacture of felt hats, the bodies, having been formed of a conical shape and subjected to the process of felting termed by hatters "sizing," retain their conical form, and require to be stretched in the tip and crown, and also at the brim, to enable the hats to receive and maintain the form subsequently given to them by the operation of blocking.

The hat-body being of a conical form, rounded at the tip, is, nevertheless, made with reference to the hat to be produced, and the different parts of it, which are afterward to be developed into the "tip," "square," "side," "crown," "band," and "brim" of the finished hat, are distinguished by imaginary lines or zones around the hat-body, and the same names applied to them, the lower part of the sides being termed the "brim," the upper part of the sides the "side crown," the line of division between the side crown and brim the "band," the rounded upper part the "tip," and the dividing-line between the tip and side crown the "square."

In stretching hat-bodies for blocking, the band is not generally stretched circumferentially, or but slightly stretched, the stretching being required in the crown and tip to produce the square or angular corner of the cylindrical or bell-crowned hat, and at the brim in order that the latter may be flat, or at right angles, or nearly so, to the side crown when blocked. And it is necessary that the body shall be stretched more in those parts which require stretching than would be sufficient to conform it to the shape of the hat-block, because, if not overstretched before blocking, the hat will shrink when, in wear, it is exposed to moisture, and tend to resume its conical shape; but if overstretched and suffered to shrink to the block, will retain its figure afterward under ordinary wear and exposure.

In stretching a hat-body for square-crowned hats, the upper part of the hat-body is circumferentially stretched most at the square or angle of intersection between the side crown and tip, beginning to stretch gradually from the center of the tip and from the band, and increasing toward the square.

The lower part of the body is stretched circumferentially most at the edge of the brim, beginning to stretch gradually from the band.

This stretching operation has hitherto been commonly performed by hand, notwithstanding the attempts that have been made to use expanding-blocks or expanding devices inside of the bodies for stretching the tips or crowns.

Hat-bodies are generally made of unequal thickness from tip to brim, but of equal thickness, as near as may be, in the direction of the circumference, and the operation of stretching—sometimes called "wet-blocking"—by hand required great skill and care to stretch the parts requiring to be stretched, and preserve the requisite circumferential equality of thickness of the body without overstraining or tearing the hat.

The object of my invention is to perform this operation of stretching hat-bodies by machinery; and to this end I have invented the new and improved machine hereinafter described, whereby both the tip and brim, or either, may be properly stretched by the operation of the machine.

My said invention of a new and improved machine for stretching hat-bodies consists, generally, of a radially-ribbed or skeleton former, whereon the hat-body is placed to be stretched, and the ribs of which act as internal supporting and stretching surfaces, and a series of external stretching devices, which act upon the outside portions of the hat-body that are to be stretched in opposition to the internal action of the ribs of the skeleton former, and between the lines of support of the same, the internal and external supporting and stretching devices being so combined and arranged, with relation to each other and to the work to be done, that when they are brought together with force they operate to stretch the hat-body embraced between them in the required places to develop the desired shape of the hat; and for the purpose of holding the hat-body in place upon the former, so that the proper portions will be stretched, a clamping-ring is also combined with the machine.

I have also made the exterior pressing or stretching devices radially adjustable in position relatively to the axis of the ribbed skeleton former, to accommodate the variations of form required; and in order to vary the degree of stretching of either the tip or brim at pleasure, I have made the external pressing or stretching devices independent of each other, and independently adjustable.

It will be observed upon inspection of the machine, as illustrated in the drawings, that although the general principle and mode of operation of the parts of the machine which act to stretch the tip are the same as in those parts that act to stretch the brim, the adaptation and arrangement of the parts for the two operations are different. The ribs which support the tip have curved or otherwise inclined surfaces to conform to the rounded tip of the hat-body, and the ribs themselves are arranged so that the recesses between them extend inward to the axis, or nearly so, in order to give room for the portions of the tip and side crown that are pressed in by the external stretching devices, and the external stretching devices converge closely together to act upon the upper surface of the tip to be stretched. The ribs which support the brim have straight surfaces radiating from a circle or cylinder of the diameter of the band, and the recesses do not necessarily extend inside of that circle or cylinder which may be the hub or support of the ribs of the former. The ribs are more in number than the ribs which support the tip, because of the greater surface of the brim to be stretched by them, and the external stretching or pressing devices are not converged together so closely as those which act upon the tip; and it will also be observed that the construction and arrangement, respectively, of the parts for stretching the tip and brim of the hat-body differ so much that neither will perform the office of the other, although both will perform their offices at the same time upon the same hat-body.

For the purpose of securing circumferential equality of action of the stretching devices upon the portions of the hat-body to be stretched, and for convenience and accuracy of adjustment and facility of operating the stretching devices in a practical machine, I have mounted the internal stretching devices, which constitute the skeleton or ribbed former, concentrically upon the upper end of a vertical sliding spindle, which is moved up and down in guides in a frame by a lever, and have attached the exterior stretching devices to the frame in positions concentric with the axis of the ribbed former, so that the latter may be lowered to put on and take off the hat-body, and lifted when the hat-body is put on, to bring the parts together so as to stretch all the parts operated upon equably in the direction of the circumference of the hat-body. If the exterior and interior devices which act upon the hat-body to stretch it were not guided in this or some equivalent manner, parts of a given zone of the circumference of the body would be apt to stretch more than others, according to their texture; but by causing the stretching-surfaces to act equably, by means of the frame and guides, uniformity in stretching is secured, as far as practicable in such operations.

To enable others skilled in the art to make and use my invention, I will now proceed to describe its construction more particularly by reference to the accompanying drawings, of which—

Figure 2:
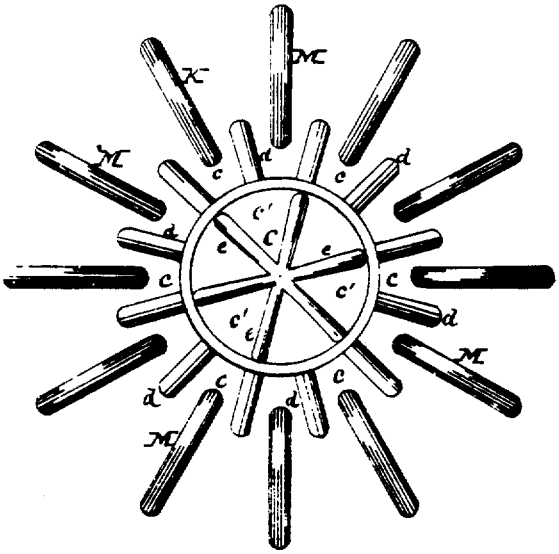
Figure 3:
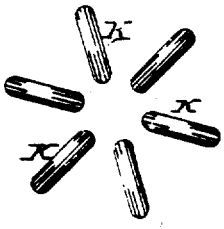

Figure 1 is a central vertical section of the machine. Fig. 2 is a plan of the radially-ribbed or skeleton former and the lower series of stretching-rollers. Fig. 3 is a plan of the arrangement of the upper series of stretching-rollers.

Similar letters of reference indicate corresponding parts in the several figures.

A is an upright frame, on the top of which is a stationary horizontal plate or table, B, having a central circular opening, *a*, under and partly within which is situated the skeleton former C, made of wood or other suitable material. This former C has its vertical profile, of conical or other form, corresponding with that of the hat-body before the stretching operation, and a portion of it at about the middle of its height is of complete circular form in its horizontal section, as shown at *b b*, in both figures, but above and below this portion it has a number of vertical recesses, *c c'*, between which are left a corresponding number of equidistant radial ribs, *d d* and *e e*, the ribs *e e* being above and those *d d* below the circular portion *b b*, and the edges of these ribs form the profile of the former. The former thus constructed is secured firmly and concentrically upon the upper end of a vertical spindle, J, which is arranged to slide up and down in guides *f f* in the center of the frame, concentric with the opening *a* in the table B, and which has applied to it a lever or treadle, D, by which it can be lifted up to raise the former.

E is a metal clamping-ring, having its interior of such size and form as to fit the circular portion *b* of the former between the upper and lower ribs *e e* and *d d*. This clamping-ring is attached by vertical rods *g g* to and below a head-piece, F, of such weight as to be capable of producing the requisite degree of pressure to hold a hat-body upon the former.

In Fig. 1 a body is exhibited upon the former in section. The rods work through guides in a stationary horizontal plate, G, which is supported by vertical pillars *h h* upon the table B, and the ring E is thereby kept concentric with the former. The clamping-ring is supported, when not supported by the former, by means of a vertical screw, H, which screws through a tapped hole in the head-piece F, and the lower end of which, bearing upon the plate G, prevents the ring E from descending below the position in which it is represented in Fig. 1.

K K are a series of thin round-edged rollers corresponding in number with the upper recesses *c'* and ribs *e* of the former C, arranged above the opening *b*, in the plate or table B, radial to the axis of the former and clamping-ring E, and opposite the center of the said recesses *c'*. The axles *k k* of these rollers are supported in hangers L L, which are secured by screws J J to the plate G, the said screws passing through radial slots in the said plate to enable them to be adjusted toward and from the axis of the former.

The surfaces of the ribs *e* and of the rollers K are the stretching-surfaces for the tip and crown of the hat-body.

M M are a series of thin rounded-edged rollers corresponding in number with the lower recesses *c* and ribs *d* of the former C, arranged below the plate or table B, radial to the axis of the former and clamping-ring E, and opposite the centers of the said recesses *c*. The axles *m m* of these rollers are supported in hangers N N, which are secured by screws *n n* to the plate or table B, the said screws passing through radial slots in the said plate or table to permit them to be adjusted toward and from the axis of the former.

The surfaces of the ribs *d* and of the rollers M are the stretching-surfaces for the brim of the hat-body.

The clamping-ring E is so adjusted by the screw H, and the rollers K and M are so adjusted by setting the hangers L N, that when a hat-body upon the former is in contact with the said ring, while the screw H rests upon the plate G, the edges of the rollers K and M are a short distance outside of the profile of the former, as shown in Fig. 1.

The operation of stretching a hat-body in this machine is as follows: The former C is first allowed to descend to such a position as to permit the hat-body to be put on and drawn tightly over it. The body, wet with hot water or steam, is put on, and the former raised up by depressing the outer end of the treadle or lever D.

When the body comes in contact with the clamping-ring E, the weight of the said ring and the attached head-piece F cause the said ring to hold it with sufficient firmness against the circular portion *b* of the former to prevent it from slipping between the ring and former, and the continued upward movement of the former, produced by a suitable pressure upon the outer end of the lever or treadle, brings the body into contact with the rollers K and M, which are thus made to press upon and stretch the portions of the body between the said rollers and the corresponding ribs of the former into the recesses *c* and *c'*. The said portions are thereby stretched over the ribs *d* and *e*. By this means the body is brought to a suitable shape for blocking and shaping the crown and brim of the hat.

Fixed round-edged surfaces may be substituted for, and would be the equivalents of, the rollers K and M; but I prefer to use the rollers, as, by preventing friction upon the hat-body, they prevent it from being torn in the stretching operation.

What I claim as my invention, and desire to secure by Letters Patent, is—

1. In a machine for stretching hat-bodies, a skeleton or ribbed and recessed former, substantially such as is herein described.

2. The combination and arrangement of the crown and tip supporting ribs with the upper series of stretching devices, substantially as described, operating to stretch the tip and side crown of the hat-body between them, substantially in the manner hereinbefore set forth.

3. The combination and arrangement of the brim-supporting ribs with the lower series of stretching devices, substantially as described, operating to stretch the brim of the hat-body between them, substantially in the manner set forth.

4. In combination with the supporting-ribs of the skeleton former, the stretching devices, operating, as hereinbefore set forth, to stretch the hat-body between them at one operation, as required for blocking, substantially as described.

5. The clamping-ring, in combination with the ribs of the skeleton or ribbed former, operating to hold the hat-body thereon during the operation of stretching, substantially as described.

6. The combination, in a machine for stretching hats, of the skeleton or ribbed and recessed former, a clamping-ring, and a system of stretching arms or rollers, the whole combined and operating substantially as described.

7. Making the stretching devices for the tip or brim adjustable radially with relation to each other, so as to vary the degree of stretching of either tip or brim, substantially as described.

RUDOLF EICKEMEYER.

Witnesses:
THEODORE FITCH,
CHAS. CROOK.